UNITED STATES PATENT OFFICE.

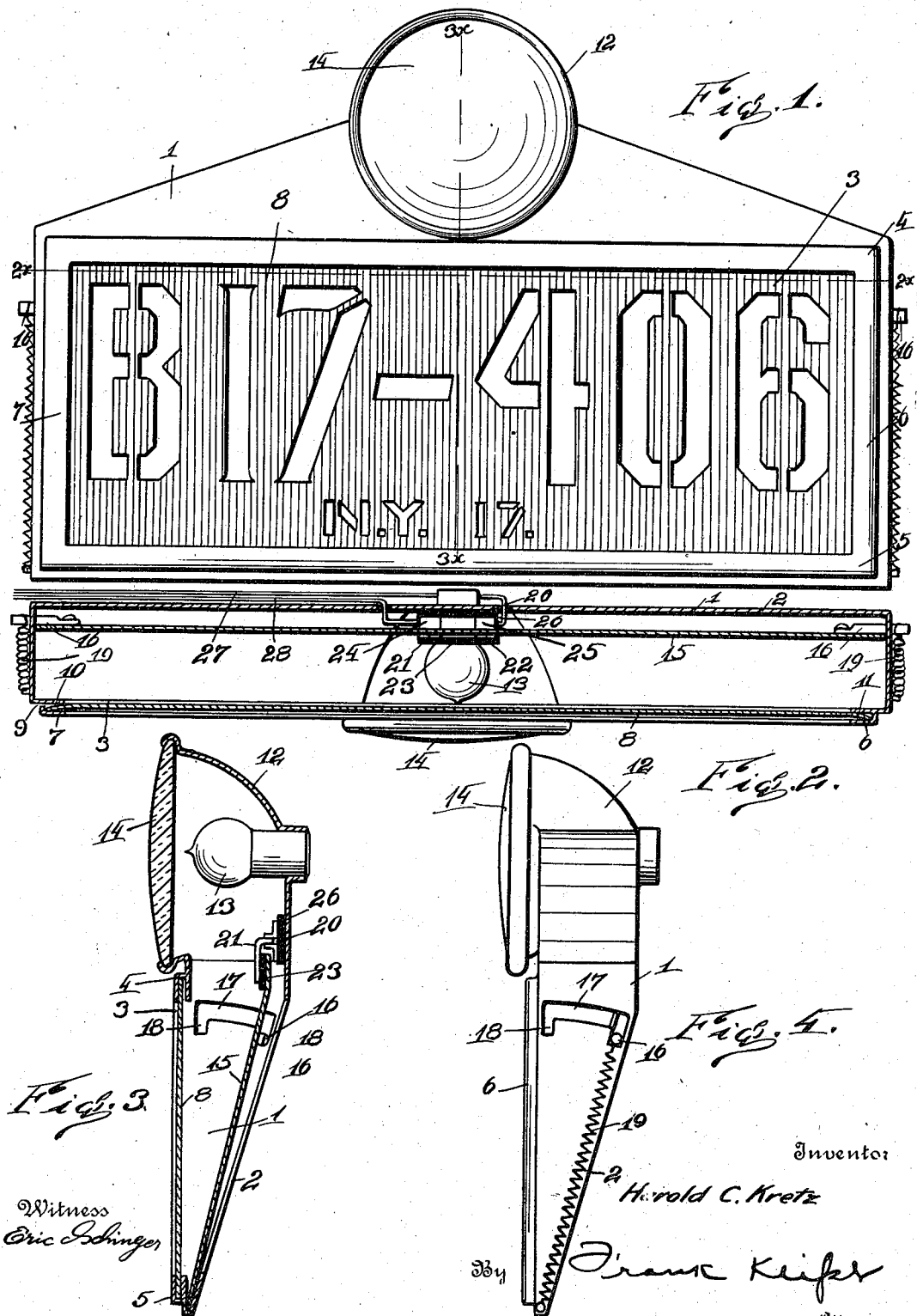

HAROLD C. KRETZ, OF ROCHESTER, NEW YORK.

LICENSE-HOLDER AND ILLUMINATING-LIGHT THEREFOR.

1,274,899.   Specification of Letters Patent.   Patented Aug. 6, 1918.

Application filed December 29, 1917. Serial No. 209,439.

*To all whom it may concern:*

Be it known that I, HAROLD C. KRETZ, a citizen of the United States, residing at Rochester, in the county of Monroe and State of New York, have invented certain new and useful Improvements in License-Holders and Illuminating-Lights Therefor, of which the following is a specification.

This invention relates to the lights used for illuminating the license number plates on automobiles and has for its object to provide a new and improved form of holder for the license number by means of which the number can be displayed to the best advantage both in daylight as well as at night.

Another object of this invention is to make the control of the front and tail light accessible only from the outside of the car so as to prevent the driver while seated in the moving car from extinguishing the lights which illuminate the license numbers of his car but requires that the driver bring the car to a standstill and leave his seat to operate the lights as will hereinafter be described.

This and other objects of this invention will be illustrated in the drawings, described in the specification and pointed out in the claims at the end thereof.

In the accompanying drawing,

Figure 1 is a front elevation of the license holder and illuminating light therefor.

Fig. 2 is a horizontal sectional view of the device, the section being taken on the line 2ˣ—2ˣ of Fig. 1.

Fig. 3 is a vertical sectional view of the device, the section being taken on the line 3ˣ—3ˣ of Fig. 1.

Fig. 4 is an end elevation of the device.

In the several figures of the drawing, like reference numerals indicate like parts.

The device as shown in the accompanying drawing consists of a casing 1 in which the rear wall 2 is inclined toward the bottom so as to make the casing wedge shaped. The front of this casing is provided with the opening 3 which is surrounded with the horizontal guides or pockets 4 and 5 and the vertical guides or pockets 6 and 7. These guides or pockets are adapted to receive the license number plate 8 which is inserted into the pockets through the slot 9 provided in the side of the vertical pocket 7.

In order to prevent the license plate from working itself out of the pockets, the license plate is slightly curved at either end as shown at 10 and 11 in Fig. 2. This curvature of the plate 8 acts as a spring so that when the plate is inserted into the pockets, the outer edge thereof will spring forwardly and away from the slot 9 which locks it in place and prevents the plate from sliding back out of the slot 9 unless the edge is straightened out and brought back in line with the slot.

The license number is marked on the plate by perforating the numbers and letters into the plate in the maner in which a stencil is cut into a sheet of metal or other suitable material.

The top of the casing 1 slopes down from the middle toward either side thereof. The sloping sides of the cover of the casing terminate at the top in the lamp hood 12 underneath which is mounted the incandescent lamp 13. The front of the lamp hood 12 is provided with the lens 14 through which the light rays from the light 13 shine.

When the device is used as a combination tail light and license number holder, the lens 14 is colored red. A green lens is substituted for this when the device is mounted at or near the front of the automobile where it is used to simply display the license number.

The tail light and front light as well as the dash lights of the automobile are preferably connected in series with one another so that if one of these lights should fail to light the driver's attention would be attracted to it owing to the absence of light in the dash lights.

Mounted to swing in the wedge shaped casing 1 is the reflecting plate 15. This plate rests with its lower edge in the V shaped pocket formed in the bottom of the casing 1 which acts as a bearing for the reflecting plate in which it can swing forwardly or rearwardly as will presently be described.

A pair of handles 16 is pivotally mounted to the reflecting plate 15, one on each side thereof. These handles project through the sides of the casing 1 and can be operated from the outside thereof. For this purpose a cam slot 17 having a pocket 18 on each end thereof is provided on each side of the casing and the handles 16 normally rest in either one or the other of these pockets.

A tension spring 19 is connected with one end thereof to each of the handles 16 while the other end thereof is anchored to the side of the casing near the bottom thereof so that each of the handles is yieldingly forced into one of the pockets 18.

The reflecting plate 15 is used at night to reflect the light rays from the electric light 13 through the stenciled license plate 8 and for this purpose is held in place at an angle near the rear of the casing as shown in Figs. 2 and 3. In this position the handles 16 engage the pockets 18 at the rear end of the cam slots 17.

The reflecting plate has preferably a white surface so that the light will clearly be reflected through the stencil plate and show the numbers and letters thereon at a distance of about 250 feet or more.

During daylight the reflecting plate 15 is swung from the angular position to a perpendicular position near the front of the casing and directly back of the license number plate 8. The white surface of the reflecting plate then serves to form a clear white background for the stenciled letters and numbers so that they can be distinguished and read at a long distance ahead or back of the car by which they are carried.

To swing the reflecting plate from its reflecting position to its background position, the handles 16 must be lifted out of the pockets 18 at the rear of the slot 17 and moved forwardly through this slot until the pockets 18 at the front are reached into which the handles are allowed to spring so as to lock the reflecting plate in an upright position back of the license plate as heretofore pointed out.

The electric current for the light 13 is automatically cut off when the device is used in daylight; that is, when the reflecting plate is used as the background for the stenciled license plate. For this purpose a switch 20 is provided which consists of a pair of contact members 21 and 22 which are mounted on an insulated plate 23 carried on the top of the reflecting plate 15 near the middle thereof.

The contact members 21 and 22 are connected in series with each other and are adapted to make contact with the sockets or contact members 24 and 25 mounted on the insulated plate 26 and carried on the back of the casing 1. The electric circuit 27 which supplies the electric current to the incandescent lamp 13 is so arranged that it first leads through the lamp 13 to the contact member 25 and when the switch 20 is closed, the circuit is completed by the movable contact members 22 and 21 and the stationary companion contact member 24. The wire 28 completes the circuit 27 and leads from the contact member 24 back to the original source of current.

From the foregoing it will be seen that when the device is used as a tail or front light, the light rays from the electric light 13 shine through the lens 14 as well as reflect from the reflecting plate 15 through the stencil plate 8 and illuminate the license number. On the other hand, when the device is to serve as a license number holder alone during daylight, the shifting of the reflecting plate not only makes the numbers and letters stenciled on the license plate clearer but it also breaks the electric circuit and extinguishes the incandescent lamp 13.

I claim:

1. In an illuminating light for automobiles, the combination of a casing, a light mounted in said casing, a lens mounted in said casing in line with said light, an opening in the front of said casing below said light, a stenciled number plate mounted in said opening, a swinging reflecting plate mounted in said casing back of said stenciled number plate.

2. In an illuminating light for automobiles, the combination of a casing, a light mounted in said casing, a lens mounted in said casing in line with said light, an opening in the front of said casing below said light, a stenciled number plate mounted in said opening, a swinging reflecting plate mounted in said casing back of said stenciled number plate, and means for shifting said reflecting plate from the angular reflecting position to a vertical background position.

3. In an illuminating light for automobiles, the combination of a casing, a light mounted in said casing, a lens mounted in said casing in line with said light, an opening in the front of said casing below said light, a stenciled number plate mounted in said opening, a swinging reflecting plate mounted in said casing back of said stenciled number plate, and means for shifting said reflecting plate from the angular reflecting position to a vertical background position, a switch operated by said swinging reflecting plate to open or close the electric circuit in series with said light.

4. In an illuminating light for automobiles, the combination of a casing, an electric light mounted in said casing, stationary contact members mounted in series with said light, a reflecting plate mounted to swing in said casing, contact members mounted on said reflecting plate, said contact members on said reflecting plate being adapted to make contact with said stationary contact members and open or close the electric circuit for said light.

5. In an illuminating light for automobiles, the combination of a casing, a light mounted in said casing, an opening in the front of said casing below said light, a stenciled number plate mounted in said opening, a swinging reflecting plate mounted in said casing back of said stenciled number plate.

6. In an illuminating light for automobiles, the combination of a casing, a light mounted in said casing, an opening in the front of said casing below said light, a stenciled number plate mounted in said opening, a swinging reflecting plate mounted in said casing back of said stenciled number plate, and means for shifting said reflecting plate from the angular reflecting position to a vertical background position.

7. In an illuminating light for automobiles, the combination of a casing, a light mounted in said casing, an opening in the front of said casing below said light, a stenciled number plate mounted in said opening, a swinging reflecting plate mounted in said casing back of said stenciled number plate, and means for shifting said reflecting plate from the angular reflecting position to a vertical background position, a switch operated by said swinging reflecting plate to open or close the electric circuit in series with said light.

In testimony whereof I affix my signature.

HAROLD C. KRETZ.